March 17, 1959     T. O. NIEMI     2,877,992
MILK STRAINER AND COOLER
Filed Feb. 13, 1956
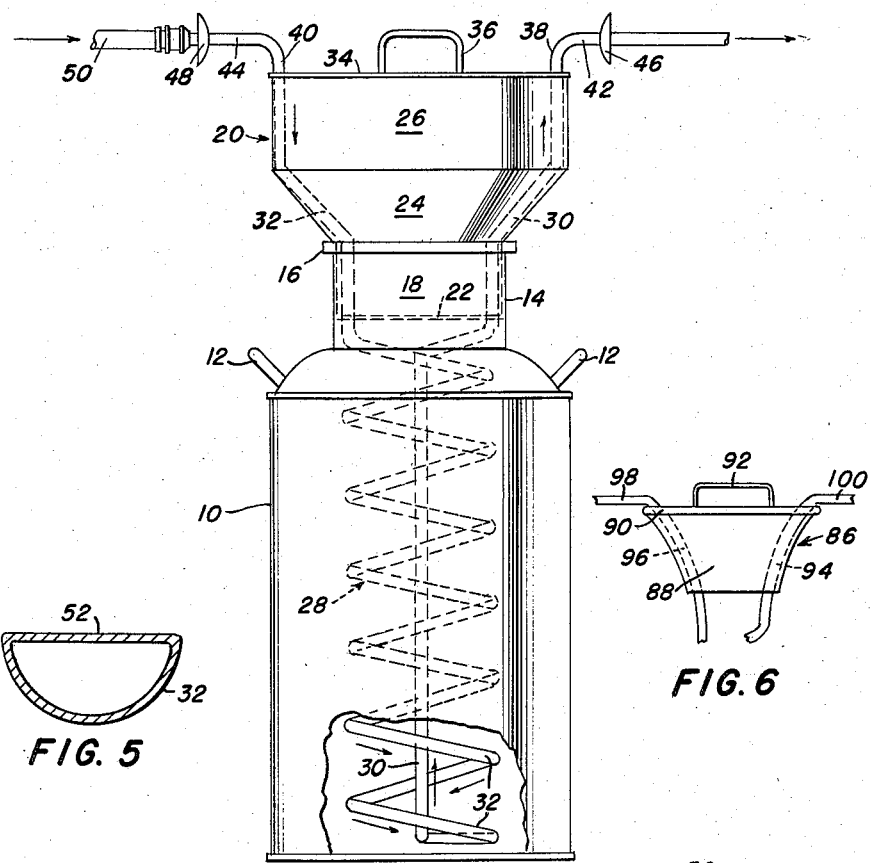
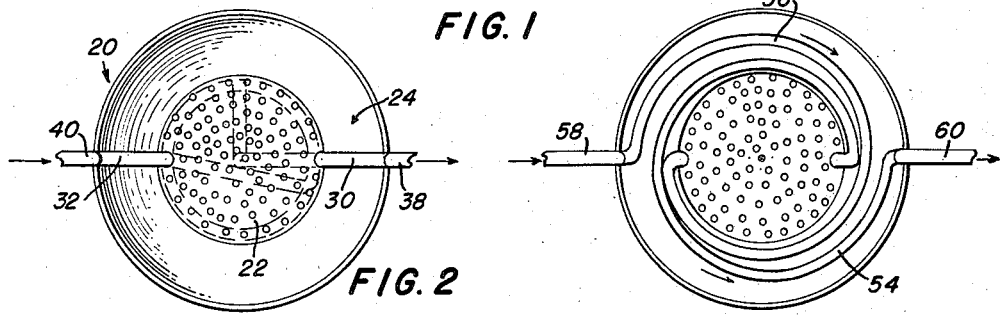
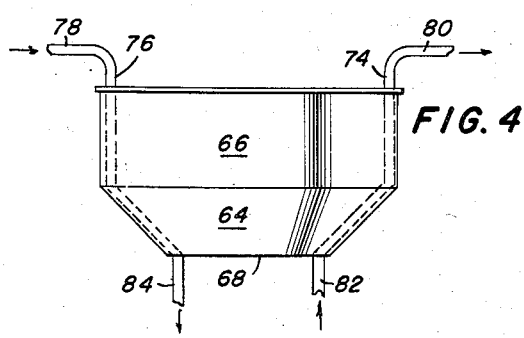
INVENTOR
TOBIAS O. NIEMI
BY
ATTORNEY

United States Patent Office 2,877,992
Patented Mar. 17, 1959

2,877,992

MILK STRAINER AND COOLER

Tobias O. Niemi, Watton, Mich.

Application February 13, 1956, Serial No. 564,997

1 Claim. (Cl. 257—199)

This invention relates to a combined milk strainer, cooler and cover device, and it particularly relates to a device which can be used with any ordinary type of milk can.

It is one object of the present invention to provide a device capable of cooling milk at least as fast as is possible with most other coolers of far greater complexity and cost.

Another object of the present invention is to provide a device that is extremely simple in construction and inexpensive both to maintain and repair.

Other objects of the present invention are to provide an improved milk-treating device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a side elevational view, partly broken away, of the device assembled in a milk container.

Fig. 2 is a top plan view of the assembly of Fig. 1, the lid being removed.

Fig. 3 is a top plan view of a modified form of the invention showing a variation in the coil structure.

Fig. 4 is a side elevational view of a modified strainer.

Fig. 5 is a cross-sectional view of the tubing in the strainer portion of Fig. 1.

Fig. 6 is an elevational view of a modified cover assembly.

Referring now in greater detail to the drawing wherein similar reference characters refer to similar parts, there is shown a milk can 10 having handles 12 and a neck 14 around the open end of which is provided a lip 16.

Within the neck 14 is fitted the cylindrical lower portion 18 of a hopper 20. The lower end of the portion 18 is closed by a perforated strainer-disc 22. The portion 18 fits snugly within the neck 14 of the can and provides a support for the upper portion of the hopper consisting of outwardly-flared funnel portion 24 and a widened, upper cylindrical portion 26 having an open upper end.

Extending through the hopper 20 and through its perforated strainer bottom 22 is a tube 28 which has one end 30 following the contour of one side of the hopper and its other end 32 following the contour of the opposite side of the hopper. The upper ends of these tube portions 30 and 32 extend through a lid 34, as by means of end slots on said lid, not shown, said lid having a handle 36 and positioned to close the upper end of the hopper, and then bend around at substantial right angles to form elbows 38 and 40 and horizontal portions 42 and 44.

Guard members 46 and 48 are provided on the portions 42 and 44 respectively, and the ends of these portions are adapted to be coupled to ordinary rubber or other flexible hose, as at 50.

The tube portions 30 and 32 within the hopper are preferably of semi-circular cross-section, as best shown in Fig. 5, with the straight side 52 fitting flush against the internal walls of the hopper so as to avoid the formation of inaccessible crevices and depressions where dirt might tend to accumulate.

The lower portion of the tube 28 is provided with a helical formation surrounding a straight vertical portion, the helical formation being provided in the portion 32 of the tube and the straight portion being part of the portion 30.

In operation, the tube portion 44 is connected by a hose, such as 50, to a water line or pump, after the can has been placed in a tank of water. The portion 42 of the tube is then either connected to a similar hose or is merely allowed to remain open.

By placing the can in the water tank, the milk begins to cool at once, and this cooling is then accelerated by permitting the water to flow from the hose 50 through the tube 28 and out of the tube portion 42. From here it can fall directly into the tank or it can be led by a hose to a pump station or the like. By placing a pumping means within the tank, the water within the tank can be constantly recycled through the tube. If desired, the cover can be placed separately from any tank and the cooling can be conducted entirely by the flow of water through the tube. Of course, other cooling media can be used instead of water, if desired.

The length of the coiled tube will vary according to the size of the can; however, the length of the coil should preferably be such that the helical turns are sufficiently far apart for easy cleaning. A good spacing between the turns has been found to be about two to two and one-half inches. The diameter of the coil should, of course, be small enough to fit through the neck of the can.

In Fig. 3, there is shown a slightly modified form of the invention wherein the portions of the tube within the hopper are coiled into a pair of helical portions 54 and 56, corresponding to the straight portions 30 and 32 in Fig. 1. The coil 56 has horizontal inlet end 58 integral therewith while coil 54 is provided with horizontal outlet end 60 also integral therewith.

The helical formation of the portions 54 and 56 in Fig. 3 have the advantage of providing a greater cooling area than is provided by the straight tube portions in Fig. 1, although this type of construction is somewhat more difficult to keep clean.

In Fig. 4 there is shown a modified form of hopper 62 which is essentially like that shown in Fig. 1 in that it comprises a funnel portion 64 integral with a cylindrical top portion 66. However, the lower cylindrical portion is deleted and the strainer is provided at the bottom of the funnel portion, at 68. The tube ends 70 and 72, having elbows 74 and 76 and horizontal inlet and outlet portions, as at 78 and 80, are similar to those shown in Fig. 1.

The elimination of the lower cylindrical portion permits the hopper 62 to fit onto any size can. In this case, the portions 82 and 84 of the tube act as supports within the neck of the can and may be changed in diameter to suit the diameter of the neck of the can.

In Fig. 6 there is shown a further modification of the invention wherein instead of having a hopper and covering lid therefor, as in Fig. 1, there is provided a cover lid member 86 comprising a lower, frusto-conical section 88 and an upper disc-like portion 90 integral with the frusto-conical section. A handle 92 is provided on the disc section 90 and the tube ends 94 and 96 extend through both sections of the cover and form horizontal inlet and outlet portions, as at 98 and 100. Here, too, the lower ends of the straight portions 94 and 96 of the tube, extend below the cover and act as supports within the can so that the cover can be used with various sizes of cans.

This cover 86 is a temporary cover which is applied to the can only during the cooling period unlike the hoppers and their lids, described above, which can be held in place during storage and shipment, if desired. They operate on the same principles as the constructions previously described, however, and can also be used for stirring the milk merely by raising them up and down. They can also be used to cool the milk while other cans are being filled.

The material of which the tubing in any of these forms of the invention should be of a rust-resistant type to prevent contamination of the milk, and may take the form of stainless steel, aluminum, a vinyl resin or other synthetic plastic, or similar types of material.

The guard members, such as indicated at 46 and 48, are used to prevent flow back of coolant drippings in the event of leaky couplings between the inlet or outlet tube ends and their corresponding hoses.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A milk cooling device comprising a hopper, said hopper comprising a funnel portion, an upper cylindrical portion integral with said funnel portion, said upper cylindrical portion being open at its upper end, a lid adapted to close the upper end of said cylindrical portion, a tube connected to said hopper and engaging the side walls thereof throughout a portion of its length, said tube being semi-circular in cross section and having its flat side flush with the side walls of said hopper to preclude the formation of crevices in which dirt may accumulate, said tube having its lower portion, depending below said hopper, helically coiled, and having its free ends extending through said hopper and through said lid, the bottom wall of said hopper comprising a perforated strainer.

References Cited in the file of this patent

UNITED STATES PATENTS

| | | |
|---|---|---|
| 1,248,179 | Sharp et al. | Nov. 27, 1917 |
| 1,768,263 | Marshall | June 24, 1930 |
| 1,801,693 | Ruff | Apr. 21, 1931 |
| 1,804,194 | Agrimson | May 5, 1931 |
| 1,861,898 | Raven et al. | June 7, 1932 |
| 2,077,846 | McIlvana | Apr. 20, 1937 |
| 2,237,107 | Newhall | Apr. 1, 1941 |
| 2,600,474 | Brunstad | June 17, 1952 |
| 2,659,579 | Boyle | Nov. 17, 1953 |
| 2,685,132 | Karr | Oct. 3, 1954 |